United States Patent
Wang et al.

(10) Patent No.: US 10,349,069 B2
(45) Date of Patent: Jul. 9, 2019

(54) SOFTWARE HARDWARE HYBRID VIDEO ENCODER

(71) Applicant: Sony Interactive Entertainment Inc., Tokyo (JP)

(72) Inventors: Jason N. Wang, Palo Alto, CA (US); Hung-Ju Lee, Pleasanton, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 774 days.

(21) Appl. No.: 13/710,794

(22) Filed: Dec. 11, 2012

(65) Prior Publication Data
US 2014/0161172 A1    Jun. 12, 2014

(51) Int. Cl.
*H04B 1/66*    (2006.01)
*H04N 19/42*    (2014.01)
*H04N 19/156*    (2014.01)

(52) U.S. Cl.
CPC .......... *H04N 19/42* (2014.11); *H04N 19/156* (2014.11)

(58) Field of Classification Search
CPC ..................................................... H04N 19/42
USPC ......................................................... 375/240
See application file for complete search history.

(56) References Cited

U.S. PATENT DOCUMENTS

| | | | |
|---|---|---|---|
| 5,774,206 A * | 6/1998 | Wasserman | H04N 19/61 375/240.15 |
| 5,812,791 A * | 9/1998 | Wasserman | H04N 19/61 375/240.15 |
| 6,782,132 B1 * | 8/2004 | Fogg | G06T 1/20 348/716 |
| 7,003,033 B2 * | 2/2006 | Kim | H03M 7/30 348/699 |
| 7,471,834 B2 * | 12/2008 | Sull | G11B 27/034 375/240 |
| 7,489,726 B2 * | 2/2009 | Vetro | H04N 21/21805 375/240.01 |
| 7,652,672 B2 * | 1/2010 | Chen | 345/552 |
| 7,920,633 B2 * | 4/2011 | Mohsenian | H04N 19/196 348/721 |

(Continued)

OTHER PUBLICATIONS

Redefining broadcast transmission systems—a software based approach; Fletcher; 2008. (Year: 2008).*

(Continued)

*Primary Examiner* — Luis Perez-Fuentes
(74) *Attorney, Agent, or Firm* — JDI Patent; Joshua Isenberg; Robert Pullman

(57) ABSTRACT

In aspects of the present disclosure, a software encoder augments a hardware encoder by implementing portions of a video encoding task that are not supported by the hardware encoder while the hardware encoder implements other portions of the encoding task. The use of a software encoder to augment a hardware encoder in this manner can extend the useful life of a hardware encoder, allow the system to adapt to changes in video coding standards, and in some cases improve performance of encoding implemented by hardware or software alone. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

26 Claims, 7 Drawing Sheets

(56) References Cited

U.S. PATENT DOCUMENTS

| | | | | |
|---|---|---|---|---|
| 8,116,245 B2* | 2/2012 | Kwon | | H04W 52/0238 |
| | | | | 370/311 |
| 8,118,676 B2* | 2/2012 | Craig | | G07F 17/32 |
| | | | | 463/40 |
| 8,380,864 B2* | 2/2013 | Bowra | | H04N 21/4344 |
| | | | | 709/231 |
| 8,429,269 B2* | 4/2013 | Kutner | | 709/224 |
| 8,483,268 B1* | 7/2013 | Alvarez | | H04N 19/14 |
| | | | | 375/240.01 |
| 8,625,678 B2* | 1/2014 | Cordara | | H04N 19/537 |
| | | | | 375/240.26 |
| 8,750,383 B2* | 6/2014 | Milstein | | H04N 19/63 |
| | | | | 375/240.19 |
| 8,855,204 B2* | 10/2014 | Vieron | | H04N 19/30 |
| | | | | 348/413.1 |
| 9,014,744 B2* | 4/2015 | Chu | | H04W 52/0238 |
| | | | | 455/522 |
| 9,025,661 B2* | 5/2015 | Karczewicz | | H04N 19/196 |
| | | | | 375/240.12 |
| 9,049,459 B2* | 6/2015 | Milstein | | H04N 19/63 |
| 9,602,814 B2* | 3/2017 | Bhagavathy | | H04N 19/119 |
| 2007/0041442 A1* | 2/2007 | Novelo | | H04N 19/597 |
| | | | | 375/240.12 |
| 2010/0260268 A1* | 10/2010 | Cowan | | H04N 13/0048 |
| | | | | 375/240.25 |
| 2011/0249133 A1* | 10/2011 | Zhou | | H04N 5/232 |
| | | | | 348/222.1 |

OTHER PUBLICATIONS

The Scalable Video Coding Extension of the H.264_AVC; Schwarz; 2008. (Year: 2008).*
Google Search for NPL; 2019. (Year: 2019).*
International Telecommunication Union, Advanced video coding for generic audiovisual services, 1-680, International Telecommunication Union, Telecommunication Standardization Sector, Geneva, Switzerland, Jan. 2012.

* cited by examiner

SOFTWARE HARDWARE HYBRID VIDEO ENCODER

BACKGROUND OF THE INVENTION

Digital signal compression (sometimes referred to as video coding or video encoding) is widely used in many multimedia applications and devices. Digital signal compression using a coder/decoder (codec) allows streaming media, such as audio or video signals to be transmitted over the Internet or stored on compact discs. A number of different standards of digital video compression have emerged, including H.261, H.263; DV; MPEG-1, MPEG-2, MPEG-4, VC1; and AVC (H.264). These standards, as well as other video compression technologies, seek to efficiently represent a video frame picture by eliminating the spatial and temporal redundancies in the picture and among successive pictures. Through the use of such compression standards, video contents can be carried in highly compressed video bit streams, and thus efficiently stored in disks or transmitted over networks.

MPEG-4 AVC (Advanced Video Coding), also known as H.264, is a video compression standard that offers significantly greater compression than its predecessors. The H.264 standard is expected to offer up to twice the compression of the earlier MPEG-2 standard. The H.264 standard is also expected to offer improvements in perceptual quality. As a result, more and more video content is being delivered in the form of AVC(H.264)-coded streams. Two rival DVD formats, the HD-DVD format and the Blu-Ray Disc format support H.264/AVC High Profile decoding as a mandatory player feature. AVC(H.264) coding is described in detail in "*Recommendation ITU-T H.264, Series H: AUDIOVISUAL AND MULTIMEDIA SYSTEMS Infrastructure of audiovisual services—Coding of moving video*, "Advanced video coding for generic audiovisual services", International Telecommunication Union, Telecommunication Standardization Sector, Geneva, Switzerland, January, 2012, the entire contents of which are incorporated herein by reference for all purposes.

Video encoding can be done on a general purpose computer in software or may be done with specialized hardware referred to as a hardware video encoder. Use of a hardware video encoder is regarded as key to achieving high performance video compression with low system resource usage. However, because the hardware encoder functionality is fixed with the design, a hardware encoder may not be able to meet future video coding requirements.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE DRAWINGS

Figure 1:
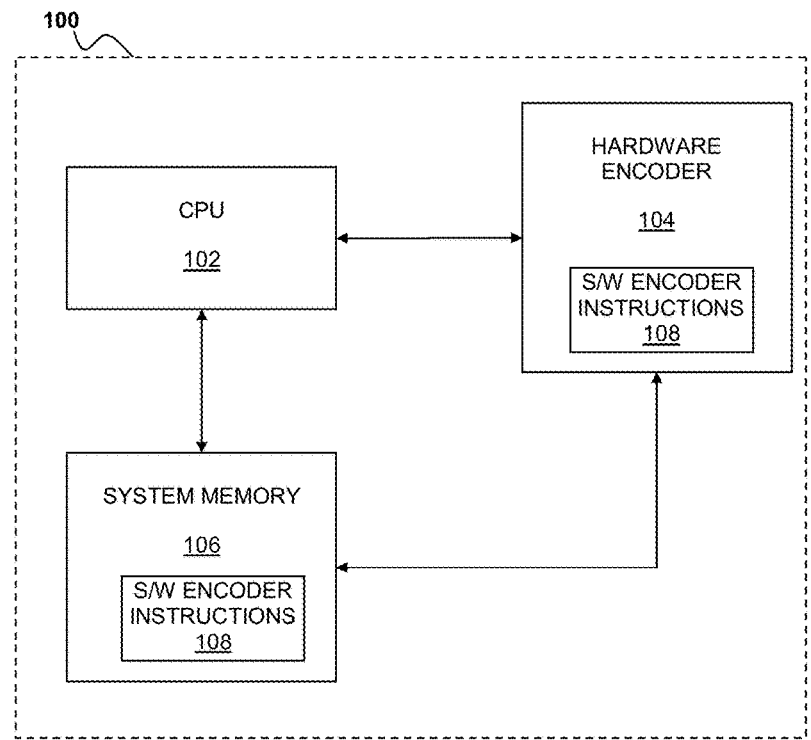
FIG. 1 is a block diagram of a computing system that uses a hardware video encoder augmented by a software video encoder according to an aspect of the present disclosure.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Modern video coder/decoders (codecs), such as MPEG2, MPEG4 and H.264 generally divide video frames into three basic types known as Intra-Frames, Predictive Frames and Bipredictive Frames, which are typically referred to as I-frames, P-frames and B-frames respectively.

An I-frame is a picture coded without reference to any picture except itself. I-frames are used for random access and are used as references for the decoding of other P-frames or B-frames. I-frames may be generated by an encoder to create random access points (to allow a decoder to start decoding properly from scratch at a given picture location). I-frames may be generated when differentiating image details prohibit generation of effective P or B frames. Because an I-frame contains a complete picture, I-frames typically require more bits to encode than P-frames or B-frames.

P-frames require the prior decoding of some other picture(s) in order to be decoded. P-frames typically require fewer bits for encoding than I-frames. A P-frame contains encoded information regarding differences relative to a previous I-frame in decoding order. A P-frame typically references the preceding I-frame in a Group of Pictures (GoP). P-frames may contain both image data and motion vector displacements and combinations of the two. In some standard codecs (such as MPEG-2), P-frames use only one previously-decoded picture as a reference during decoding, and require that picture to also precede the P-frame in display order. In H.264, P-frames can use multiple previously-decoded pictures as references during decoding, and can have any arbitrary display-order relationship relative to the picture(s) used for its prediction.

B-frames require the prior decoding of a reference frame, e.g., either an I-frame or a P-frame in order to be decoded. In some coding standards, e.g., the AVC/H.264 standard, a prior decoded B-frame may be used as a reference frame for decoding a subsequent B-frame. Like P-frames, B-frames may contain both image data and motion vector displacements and/or combinations of the two. B-frames may include some prediction modes that form a prediction of a motion region (e.g., a segment of a frame such as a macroblock or a smaller area) by averaging the predictions obtained using two different previously-decoded reference regions. In some codecs (such as MPEG-2), B-frames are never used as references for the prediction of other pictures. As a result, a lower quality encoding (resulting in the use of fewer bits than would otherwise be used) can be used for such B pictures because the loss of detail will not harm the prediction quality for subsequent pictures. In other codecs, such as H.264, B-frames may or may not be used as references for the decoding of other pictures (at the discretion of the encoder). Some codecs (such as MPEG-2), use exactly two previously-decoded pictures as references during decoding, and require one of those pictures to precede the B-frame picture in display order and the other one to follow it. In other codecs, such as H.264, a B-frame can use one, two, or more than two previously-decoded pictures as references during decoding, and can have any arbitrary display-order relationship relative to the picture(s) used for its prediction. B-frames typically require fewer bits for encoding than either I-frames or P-frames.

As used herein, the terms I-frame, B-frame and P-frame may be applied to any streaming data units that have similar properties to I-frames, B-frames and P-frames, e.g., as described above with respect to the context of streaming video.

In previous codec systems, a hardware video encoder is used as the data processing pipeline in an encoder application. The hardware encoder defines the application video encoding capability. In this disclosure, by contrast, the encoder data processing pipeline is designed according to the application requirement. A hardware encoder accelerator is fitted into the pipeline as a sub-module.

The hardware video encoder external interface is different from implementation to implementation. It is hard to design a general solution to expend all hardware encoder functionalities. However, if the hardware structure is stable, it is possible to customize an encoding pipeline to incorporate a particular hardware encoder.

Although this disclosure presents possible functionality extension for a particular hardware platform, a similar idea could be applied to different hardware encoders with changes according to the hardware encoder capabilities.

Sometimes, the hardware encoder block referred in this disclosure could be another programmable device with limited data processing power. Aspects of the present disclosure could be used to improve the encoder, which is integrated in a programmable device.

Detailed Explanation

In a hardware configuration shown in FIG. 1, a video encoding system 100 includes a central processing unit (CPU) 102, a hardware encoder 104 and a system memory 106. The system is configured to implement video encoding using the hardware encoder 104 augmented by specialized software encoding implemented by encoder instructions 108 that can be stored in the memory 106 and executed on the CPU 102. The CPU 102 is a programmable device and the hardware encoder 104 is a fixed function device. In a conventional video encoding system, with this type of hardware configuration, the CPU is normally configured to execute a variety of user applications. Some of these applications may receive and/or generate uncompressed input video streams. The user applications may call on video encoding applications to compress the input video streams, which call on the hardware encoder to encode input uncompressed video streams. In these conventional implementations, the CPU 102 does not augment the video compression performed by the hardware encoder 104 by performing part of the encoding.

Unlike previous implementations, the system 100 may be configured such that CPU implements part of the process of video compression by executing the encoder instructions 108.

There are a number of different types of system 100 that may make use of both a hardware and software encoder in this manner. By way of example, and not by way of limitation, the system may be a home video game console. Alternatively, the system may be a video conference, video editing, or video surveillance system. In such an example, the hardware encoder 104 could receive a sequence of uncompressed YUV video images and output an AVC elementary stream. The hardware encoder 104 may only support a sub-set of AVC standard defined coding features. For example, the hardware encoder may have some or all of the following limitations:

1. Only I or P prediction type is allowed.
2. There may be a maximum number of references, e.g., one frame or two fields.
3. There may be a limited number of macroblocks encoded per second
4. AVC multi-view profile and stereo profile are not supported.
5. Only one-pass encoding is possible.
6. The hardware encoder cannot take more than one layer of video content
7. The hardware encoder may lack some AVC coding tools, such as adaptive weighted prediction, long term reference and MB frame field adaptive coding.
8. The hardware encoder may have a limited maximum input frame resolution and frame rate.
9. The hardware encoder can only encode input video in a standard defined process.

In aspects of the present disclosure, the software encoder running on the CPU 102 augments the hardware encoder by implementing portions of a video encoding task that are not supported by the hardware encoder 104 while the hardware encoder implements other portions of the encoding task. The use of a software encoder to augment a hardware encoder in this manner can extend the useful life of a hardware encoder, allow the system 100 to adapt to changes in video coding standards, and in some cases improve performance of encoding implemented by hardware or software alone.

Many different techniques based on this concept may be used to overcome different combinations of hardware encoder limitations, such as those listed above. By way of a first example, suppose the hardware encoder has the following combination of limitations:

1. Only I or P prediction type is allowed.
2. The maximum number of reference is one frame or two fields.
3. The hardware encoder can only encode a limited number of macroblocks per second.

An example of a hardware encoder having such limitations is the Video Codec Engine (VCE) from Advanced Micro Devices, Inc.

In this example, the particular combination of limitations could be overcome in a system 200 in which the hardware encoder 104 is augmented with a B picture software encoder 108. This may be understood with reference to FIG. 2. An input video 210 is split into a first stream 211 and a second stream 212. Pre-encoding processes, such as splitting, resolution down-sampling and frame rate down-sampling may be done by an encoder pre-processing module. There are existing pre-processing hardware devices that may be used to implement such processes. Conceptually, such a pre-processing module may be regarded as a separate module from the software encoder and the hardware encoder. In alternative implementations, such pre-encoding processes may be implemented by a software module executed by a central processing unit (CPU) or graphics processing unit (GPU).

The first stream 211 is delivered to the hardware encoder 104, as shown by arrow 1, and is encoded in order to produce I and P pictures. The second stream 212 is delivered to a software encoder 108, as shown by arrow 2, and is encoded in order to produce B pictures. The software encoder 108 may use the hardware encoder's output (i.e., the I and/or P pictures) as references for motion prediction in order to encode the second stream 212 more efficiently. Each B picture may use more than one reference frame. By way of example, the software encoder 108 may utilize the Picture 0 (I) and Picture 3 (P) as prediction references for the encoding of Picture 1 (B). Additionally, the software encoder may use the hardware encoder macroblock prediction modes to narrow down prediction mode search candidates and speed up the encoding process. By adding B pictures, the output bit stream coding efficiency will be improved over the output of a hardware only encoder.

Figure 2:
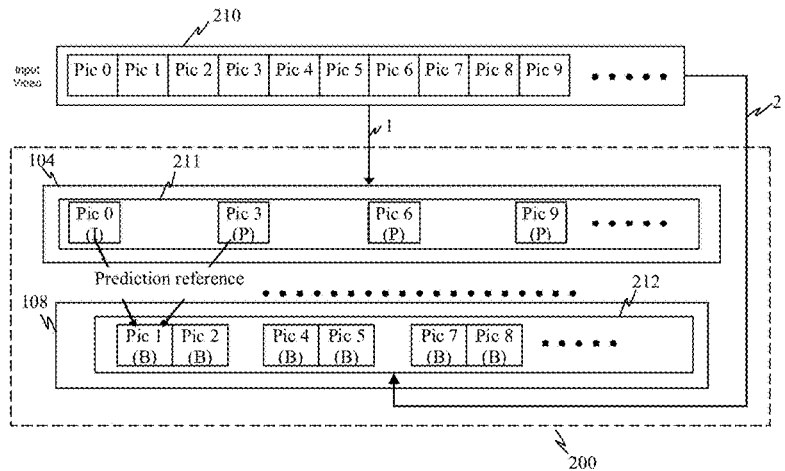
FIG. 2 is a schematic diagram illustrating a first example of encoding with a computing system that utilizes both hardware and software encoder according to an aspect of the present disclosure.

As shown in this example, the resulting combined hardware/software encoder system 200 can support B picture encoding with potentially three times the macroblock encoding rate of a system that uses a hardware encoder only. It is noted that the implementation shown in FIG. 2 is just one of many possible examples, which may differ slightly from FIG. 2. For example, other variations on the implementation shown in FIG. 2 may choose a different number of B pictures between a pair of I/P pictures.

In addition to the implementation shown in FIG. 2, there are other implementations within the scope of aspects of the present disclosure that can be used to address other possible limitations of the hardware encoder.

As another example, suppose the hardware encoder suffers from limitation 4, above, i.e., AVC multi-view profile and stereo profile are not supported. Some examples of hardware encoders that suffer from this limitation include the MG3500 from Maxim, the MB86H50 from Fujitsu, and the VCE from AMD.

Figure 3:
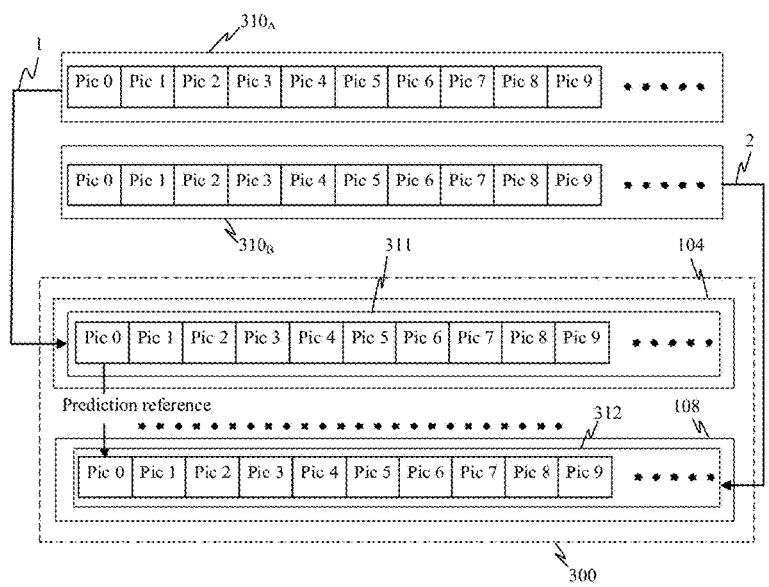
FIG. 3 is a schematic diagram illustrating a second example of encoding with a computing system that utilizes both hardware and software encoder according to an aspect of the present disclosure.

This limitation could be overcome by utilizing a system 300 that utilizes a software encoder 108 to encode the additional views that are not supported by the hardware encoder 104. In the non-limiting example of a stereo profile, there are two views to be encoded (e.g., one for the left eye $310_A$ and one for the right $310_B$). As shown in FIG. 3, a first view $310_A$ may be delivered to the hardware encoder 104, as shown by arrow 1. The hardware encoder 104 may encode the first view $310_A$ in order to produce a first encoded view 311. A second view $310_B$ may be delivered to a software encoder 108, as shown by arrow 2. The software encoder 108 encodes the second view $310_B$ in order to produce a second encoded view 312. The software encoder 108 may use the first encoded view 311 as the reference for encoding the second view $310_B$. By way of example, Picture 0 from the first view $310_A$ may be encoded by the hardware encoder 104 in order to produce the first encoded view 311 of Picture 0. Thereafter, the software encoder 108 may utilize the first encoded view 311 of Picture 0 as a reference in order to improve the efficiency of encoding Picture 0 from the second view $310_B$. Additionally, the software encoder 108 may use the hardware encoder macroblock prediction modes to narrow down prediction mode search candidates and speed up the encoding process.

It is noted that the implementation shown in FIG. 3 is just one of many possible examples, which may differ slightly from FIG. 3. For example, other variations on the implementation shown in FIG. 3 may include more than two video inputs. The video inputs may be multiplexed to form a three-dimensional image when viewed with or without specialized three-dimensional LCD shutter glasses, or the video inputs may be multiplexed to allow for multiple viewers to view separate content with the used of LCD shutter glasses. Further, the two or more video inputs may be generated by a user's three-dimensional video camera comprised of two image capture devices.

As yet another example, a system 400 may be configured to address a hardware encoder with the following combination of limitations:
5. The hardware encoder only supports one pass encoding.
6. The hardware encoder cannot take more than one layer of video content
7. The hardware encoder lacks some AVC coding tools, such as adaptive weighted prediction, long term reference and MB adaptive frame field (MBAFF) coding.

Some examples of hardware encoders that only support one pass encoding and do not cannot take more than one layer of video content include the MG3500 from Maxim, the MB86H50 from Fujitsu, and the VCE from AMD. Of these, the VCE lacks adaptive weighted prediction and MBAFF coding tools.

Figure 4A:
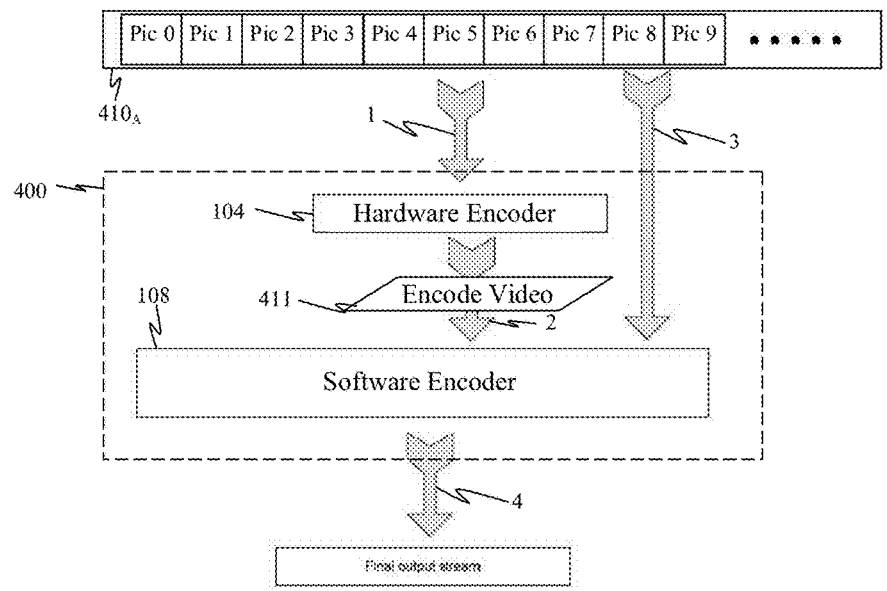
FIG. 4A is a schematic diagram illustrating a third example of encoding with a computing system that utilizes both hardware and software encoder according to an aspect of the present disclosure.

System 400 could address these limitations if it is configured to implement a two-pass encoding routine with the hardware encoder 104 performing the first pass and the software encoder 108 performing the second pass. As shown in FIG. 4A, the primary input video $410_A$ is delivered to the hardware encoder 104, as shown by arrow 1. The hardware encoder 104 encodes the primary input video $410_A$ to create a first pass encoded video 411. The first pass encoded video 411 may then be delivered to the software encoder 108, as shown by arrow 2, along with the primary input video $410_A$, as shown by arrow 3. The second pass encoding is implemented by re-encoding the primary input stream $410_A$ with improved video quality and better rate control. The second pass encoding can improve coding quality by refining prediction modes and implementing coding tools that are not implemented by the hardware encoder 104. Once the second pass is completed, the software encoder 108 may deliver an output stream that has been encoded to an end user as shown by arrow 4.

Figure 4B:
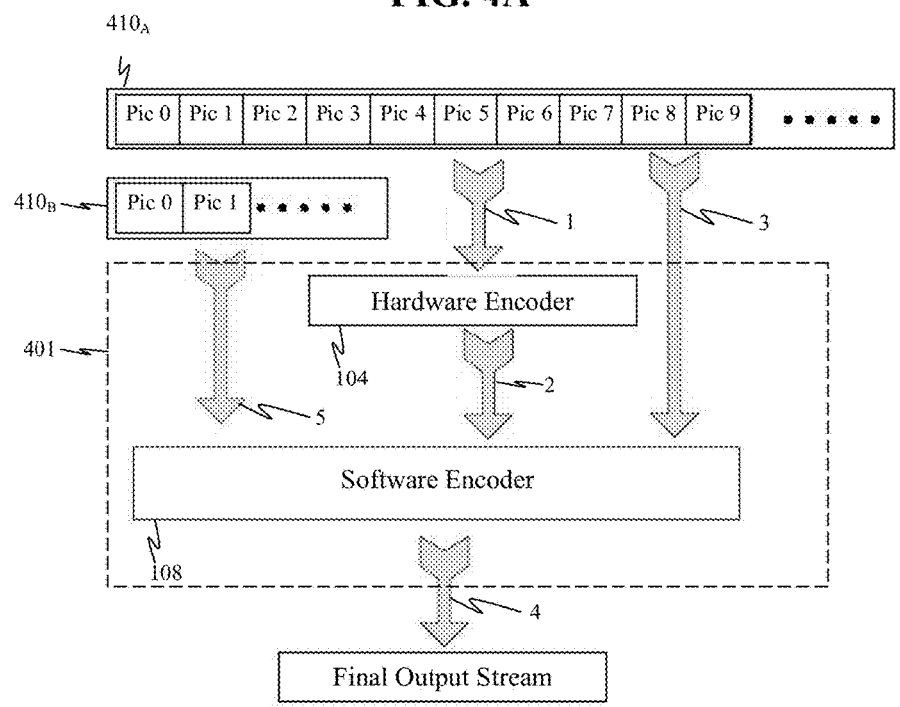
FIG. 4B is a schematic diagram illustrating a fourth example of encoding with a computing system that utilizes both hardware and software encoder according to an aspect of the present disclosure.

Optionally, the software encoder 108 may receive a second layer of video content $410_B$, as shown by arrow 5 in FIG. 4B. The second layer of video content $410_B$ may be alpha blended with the primary input video $410_A$ during the second encoding pass. By way of example, and not by way of limitation, the second layer of video content $410_B$ may be a computer generated texture, and system 401 may alpha blend the texture on top of a camera input video $410_A$.

In addition to the previous implementations, there are other implementations within the scope of aspects of the present disclosure that can be used to address other possible limitations of the hardware encoder.

As another example, suppose the hardware encoder suffers from limitation 8, i.e., a limited maximum input frame resolution and frame rate. Some examples of hardware encoders that have resolution and frame rate limitations include the MG3500 from Maxim, the Makito H.264 HD Encoder, the XVE9300 from NTT, the MB86H50 from Fujitsu, and the VCE from AMD. Specifically, the MG3500, Makito H.264 HD Encoder, XVE9300 and VCE have resolution limited to 1920×1088 pixels and the MB86H50 has a resolution limited to 1440×1088 pixels at 30 frame/second, 60 frame/second, 24 frame/second, and 30 frame/second respectively.

Figure 5A:
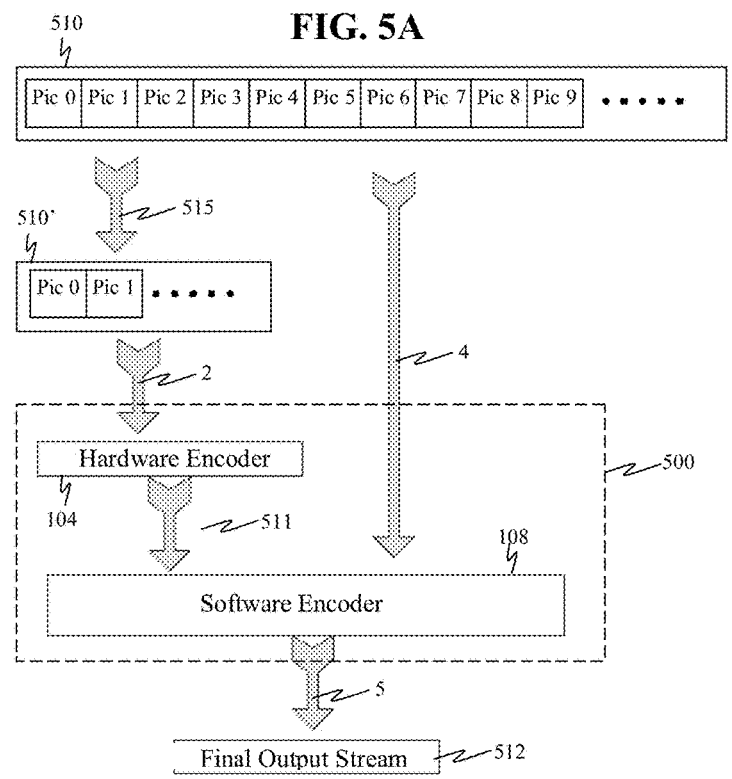
FIG. 5A is a schematic diagram illustrating a fifth example of encoding with a computing system that utilizes both hardware and software encoder according to an aspect of the present disclosure.

System 500 could address the maximum input frame resolution limitation of a hardware encoder if it is configured to process new video applications that contain high input frame resolution by combining the performance capabilities of a hardware encoder 104 and a software encoder 108, as described in the following example and in FIG. 5A. By way of example, the new video application may be the production of a high resolution video stream 510. In this instance, the addition of a software encoder 108 may expand the functionality of the hardware encoder 104, such that system 500 may be able to encode the high resolution video input 510. By way of example, overcoming this limitation is useful, in applications involving high resolution (e.g., 4 k×2 k) video compression or multiple screen gaming.

With the combination of a hardware and software encoder 104, 108, a video input stream 510 with 4 k×2 k resolution or larger may be more efficiently compressed. For example, as indicated by arrow 515, an application may first scale down the resolution of the input stream 510 to a lower resolution input stream 510' that is compatible with the hardware encoder 104. As noted above pre-encoding processes, such as down-scaling may be done by an encoder pre-processing module. There are existing pre-processing hardware devices that may be used to implement such processes. Conceptually, such a pre-processing module may be regarded as a separate module from the software encoder and the hardware encoder. In alternative implementations, such pre-encoding processes may be implemented by a software module executed by a central processing unit (CPU) or graphics processing unit (GPU).

The hardware encoder 108 may then receive the lower resolution input stream 510', as indicated by arrow 2. Thereafter the hardware encoder 104 may encode the low resolution input stream 510' and deliver the encoded low resolution input stream 511 to the software encoder 108 as indicated by arrow 3. The encoding process implemented by the hardware encoder 104 may generate a bitstream and/or MB/Frame information (e.g., Quantization Parameter (QP) value, MV, reference frame, number of bits per MB, number of bits per x-form coefficient, prediction mode, frame type, slice type, etc.) This information may come directly from the hardware encoder 104, or the software encoder 108 may partially decode the hardware encoder's 104 output bitstream to get the information. After receiving the high resolution video input stream 510 as shown by arrow 4, the software encoder 108 may use the additional information from the encoded low resolution input stream 511 to improve its efficiency in encoding the high resolution video input stream 510, e.g., by shortening a motion search by the partial results from the hardware encoder 104. Once the software encoder 108 has completed encoding the high resolution video input stream 510, the software encoder 108 may deliver a final output stream 512 to an end user device as shown by arrow 5.

The software encoder may use the lower-resolution video input stream 511 as more than a prediction reference. For example, in some implementations the bit count of a encoded macroblock and the macroblock type information are also useful for rate control.

Figure 5B:
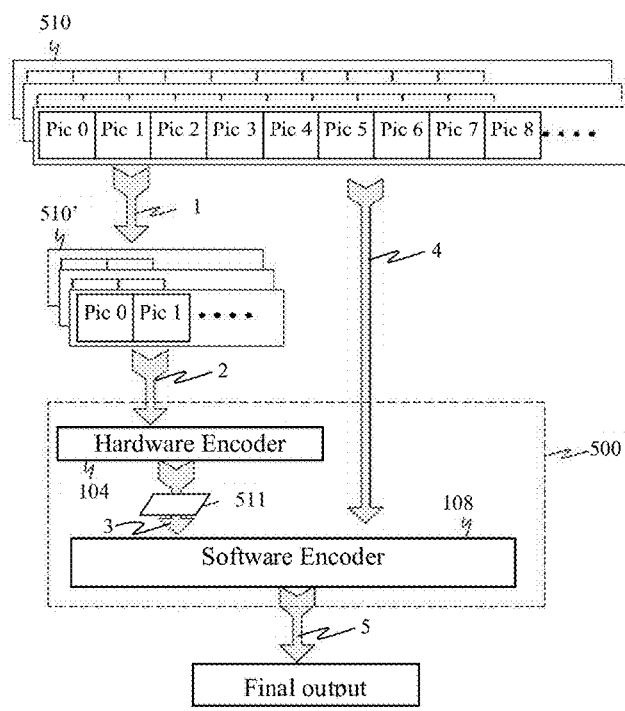
FIG. 5B is a schematic diagram illustrating a sixth example of encoding with a computing system that utilizes both hardware and software encoder according to an aspect of the present disclosure.

Additionally, FIG. 5B describes a similar combination of hardware and software encoders 104, 108 that allows for the encoding of a plurality of input video streams 510. This is useful in a situation such as a multiple player game in which two or more players are sharing the same screen. Under this gaming environment there may be a plurality of input video streams 510, one for each game player, that each need to be encoded. By way of example, and not by way of limitation, FIG. 5B depicts an example in which three video input streams are encoded. The hardware encoder 104 alone may not be able to encode all these streams in real time. Therefore, it is desirable to use the combination hardware and software encoder 501. Instead of scaling down a single high resolution video stream 510, an application may scale down each of the standard resolution video streams 510 as shown by arrow 1. Then, these low resolution video streams 510' may be delivered to the hardware encoder as shown by arrow 2.

The hardware encoder 104 may then encode the low resolution video streams 510' and deliver the encoded low resolution video streams 511 to the software encoder 108, as shown by arrow 3. With the help of the information derived from the hardware encoder's processing of these low resolution streams (e.g., the motion information), the software encoder 108 may then receive the plurality of input video streams 510, as shown by arrow 4, and compress each of the video streams 510 faster. Once the software encoder 108 has completed encoding the plurality of video input streams 510, the software encoder 108 may deliver the output streams to the end users as shown by arrow 5.

Figure 6:
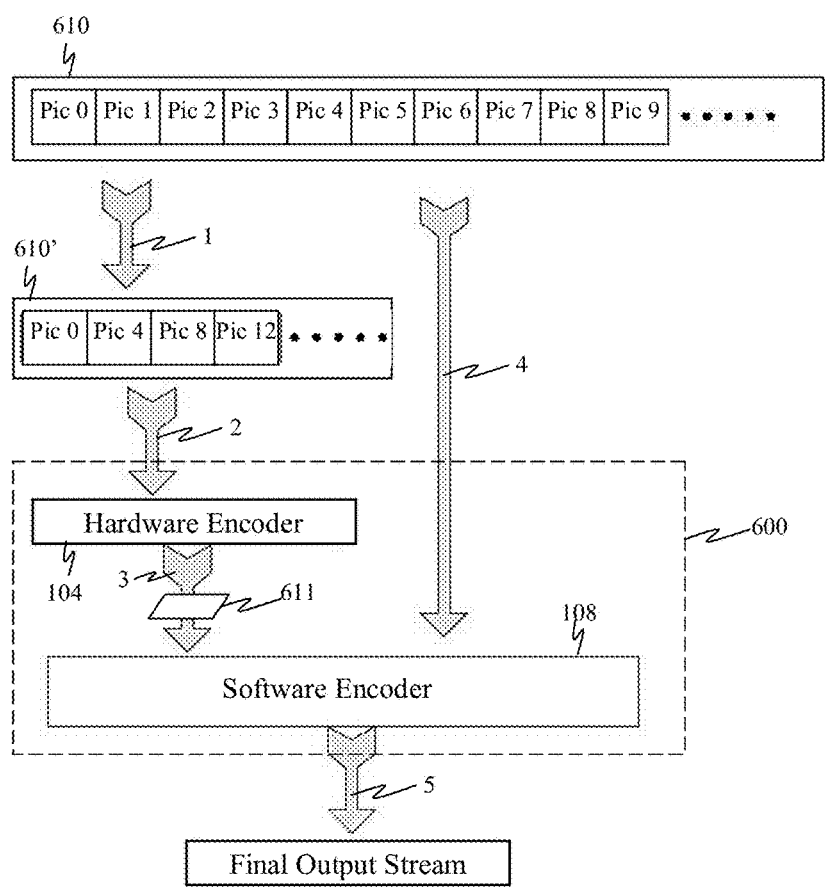
FIG. 6 is a schematic diagram illustrating a seventh example of encoding with a computing system that utilizes both hardware and software encoder according to an aspect of the present disclosure.

In accordance with an additional aspect of the present disclosure, system 600 may be utilized to increase the efficiency of encoding high frame rate video (e.g., 120 fps or 240 fps) as shown in FIG. 6. For example, as indicated by arrow 1, an application may first reduce the frame rate of the input stream 610 to an input stream 610' with a lower frame rate that is compatible with the hardware encoder 104.

As noted above down-scaling may be done by an encoder pre-processing module. There are existing pre-processing hardware devices that may be used to implement such processes. Conceptually, such a pre-processing module may be regarded as a separate module from the software encoder and the hardware encoder. In alternative implementations, such pre-encoding processes may be implemented by a software module executed by a central processing unit (CPU) or graphics processing unit (GPU).

By way of example, and not by way of limitation, the frame rate in FIG. 6 is reduced by utilizing only every fourth frame. The low frame rate input stream 610' is then delivered to the hardware encoder 108, as shown by arrow 2.

The hardware encoder 108 may then encode the low frame rate input stream 610' in order to produce an encoded low frame rate input stream 611. The encoding process implemented by the hardware encoder 104 may generate a bitstream and/or MB/Frame information (e.g., Quantization Parameter (QP) value, MV, reference frame, number of bits per MB, number of bits per x-form coefficient, prediction mode, frame type, slice type, etc.) This information may come directly from the hardware encoder 104, or the software encoder 108 may partially decode the hardware encoder's 104 output bitstream to get the information. The encoded low frame rate input stream 611 may then be delivered to the software encoder 108, as shown by arrow 3. With this additional information, the software encoder 108 may improve its efficiency in encoding the high frame rate video input stream 610 that it received as shown by arrow 4. By way of example, and not by way of limitation, the efficiency may be improved by identifying macroblocks in the encoded low frame rate input stream 611 that are part of the background. Once the software encoder 108 has completed encoding the high frame rate video input stream 610, the software encoder 108 may deliver the output streams to an end user as shown by arrow 5.

In addition to the implementations described above, there are other implementations within the scope of aspects of the present disclosure that can be used to address other possible limitations of the hardware encoder. As another example, suppose the hardware encoder suffers from limitation 9, above, i.e., the hardware encoder can only encode input video in a standard defined process. Some examples of hardware encoders that are not customizable for non-standard processes include the MG3500 from Maxim, the Makito H.264 HD Encoder, the XVE9300 from NTT, the MB86H50 from Fujitsu, and the VCE from AMD.

According to yet another additional aspect of the present disclosure, a combination hardware/software encoder system 700 may allow for the encoding an input frame sequence that is arranged in a tree structure. Tree structure frame inputs are described in detail in commonly owned U.S. patent application Ser. No. 12/634,570 entitled "SERVER-SIDE RENDERING", filed Dec. 9, 2009 and incorporated herein in its entirety. A tree structure frame input allows a processor to begin rendering frames of possible actions a user may take in the future. Therefore, this structure allows for multiple frames to be rendered for one frame timing in order to account for multiple possible user actions. By way of example, and not by way of limitation, a tree structure frame input may be used in a video game. The processor running the game may preemptively begin generating frames of potential game outcomes. The trunk of the tree structure is what the frame will be if a user playing the game provides no further inputs into the game. However, the processor may begin rendering branches from the trunk, wherein each branch represents the frames that would be rendered by a graphics processor if the user provided an input, such as directing an avatar in the game to move left, right, up, or down. Once a user action is detected by the processor, the selected branch becomes the new trunk. Currently, there is no existing video coding standard that can handle such tree structure input frame sequences.

Figure 7A:
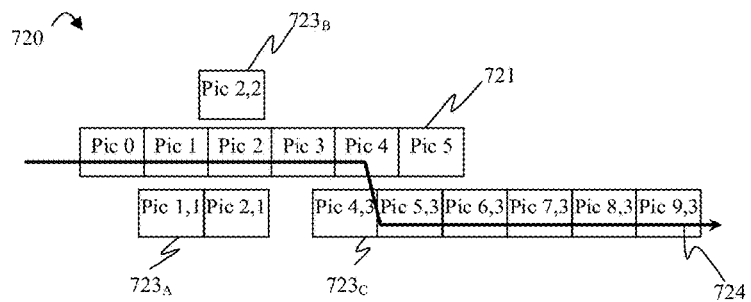
FIGS. 7A and 7B are schematic diagrams illustrating an eighth example of encoding with a computing system that utilizes both hardware and software encoder according to an aspect of the present disclosure.

FIG. 7A depicts a frame tree 720. The trunk 721 is the center row of Pictures (Pic 0-Pic 5). The groupings of frames above and below the trunk 721 represent the branches 723 of the tree. Pic 1,1 represents the beginning of branch $723_A$, Pic 2,2 represents branch $723_B$, and Pic 4,3 represents the beginning of branch $723_C$. As shown by the line 724, the trunk 721 is switched to branch $723_C$ at Pic 4.

In order to encode the frame tree 720 the hardware encoder 104 is assigned to encode the frames comprising the trunk 721, and the software encoder 108 is assigned to encode the frames comprising the plurality of branches 723.

Figure 7B:
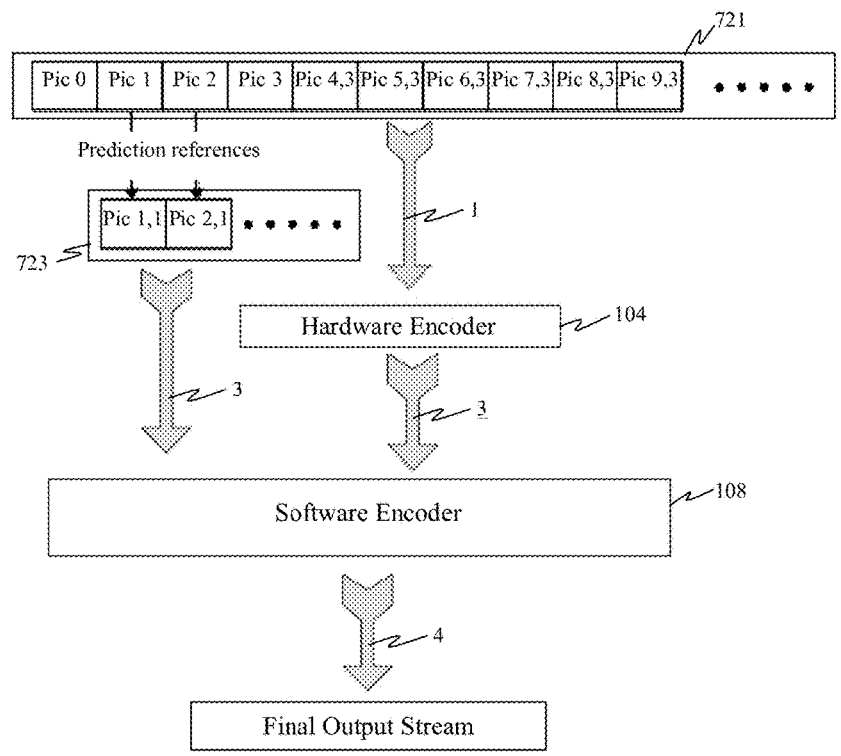

By way of example system 700 in FIG. 7B has been provided with an input from a user that indicates the branch $723_C$ was taken. Therefore, the trunk 721 progresses from Pic 0 to Pic 3, and then continues on along the path of Pic 4,3. The frames comprising the trunk 721 are each encoded by the hardware encoder 104 as shown by arrow 1. The encoded trunk frames 721' are then delivered to the software encoder 108, as shown by arrow 2. The frames that comprise the branches 723 are encoded by the software encoder 108, as shown by arrow 3. Additionally, in order to improve the efficiency of encoding the branches 723, the software encoder 108 may utilize the trunk frames that correspond to the same frame timing as the branch frame that is being encoded as prediction references. By way of example, in FIG. 7B Pic 1 from the trunk 721 may be used as a prediction reference for Pic 1,1 of the branch 723. The software encoder 108 may recombine the branches 723 with the trunk 721 once they are both encoded and deliver them both to and end user as a final output stream as shown by arrow 4.

Figure 8:
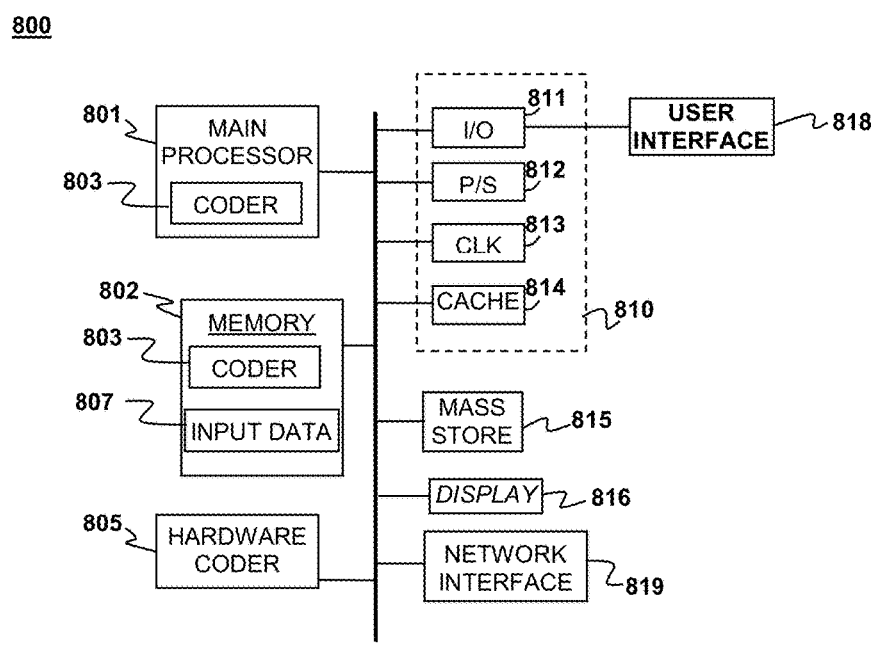
FIG. 8 is a schematic diagram of an example of system that utilizes both a hardware and software encoder according to an aspect of the present disclosure.

Aspects of the present disclosure include systems configured to implement a combined hardware/software encoder and various methods of the types described above. By way of example, and not by way of limitation, FIG. 8 illustrates a block diagram of a computer system 800 that may be used to implement video coding according to aspects of the present disclosure. The system 800 generally may include a main processor module 801, a memory 802 and a hardware coder 805. The processor module 801 may include one or more processor cores, e.g., single core, dual core, quad core, processor-coprocessor, Cell processor, architectures, and the like.

The memory 802 may be in the form of an integrated circuit, e.g., RAM, DRAM, ROM, and the like. The memory may also be a main memory that is accessible by all of the processor cores in the processor module 801. In some embodiments, the processor module 801 may have local memories associated with one or more processor cores or one or more co-processors. A software coder program 803 may be stored in the main memory 802 in the form of processor readable instructions that can be executed on the processor module 801. The coder program 803 may be configured to encode a picture into compressed signal data in conjunction with the hardware encoder 805, e.g., as described above. By way of example, and not by way of limitation, some possible hardware encoders include the MG3500 from Maxim, the Makito H.264 HD Encoder, the XVE9300 from NTT, the MB86H50 from Fujitsu, and the VCE from AMD. The coder program 803 may be written in any suitable processor readable language, e.g., C, C++, JAVA, Assembly, MATLAB, FORTRAN and a number of other languages.

Input or output data 807 may be stored in memory 802. During execution of the coder program 803, portions of program code and/or data 807 may be loaded into the memory 802 or the local stores of processor cores for processing the processor 801. By way of example, and not by way of limitation, the input data 807 may include video pictures, or sections thereof, before encoding or decoding or at intermediate stages of encoding or decoding. In the case of encoding, the data 807 may include buffered portions of streaming data, e.g., unencoded video pictures or portions thereof. In the case of decoding, the data 807 may include input data in the form of un-decoded sections, sections that have been decoded, but not post-processed and sections that have been decoded and post-processed. Such input data may include data packets containing data representing one or more coded sections of one or more digital pictures. By way of example, and not by way of limitation, such data packets may include a set of transform coefficients and a partial set of prediction parameters. These various sections may be stored in one or more buffers. In particular, decoded and/or post processed sections may be stored in an output picture buffer implemented in the memory 802.

The apparatus 800 may also include well-known support functions 810, such as input/output (I/O) elements 811, power supplies (P/S) 812, a clock (CLK) 813 and cache 814. The apparatus 800 may optionally include a mass storage device 815 such as a disk drive, CD-ROM drive, tape drive, or the like to store programs and/or data. The device 800 may also optionally include a display unit 816 and user interface unit 818 to facilitate interaction between the apparatus 800 and a user. The display unit 816 may be in the form of a cathode ray tube (CRT) or flat panel screen that displays text, numerals, graphical symbols or images. The user interface 818 may include a keyboard, mouse, joystick, light pen, or other device that may be used in conjunction with a graphical user interface (GUI). The apparatus 800 may also include a network interface 820 to enable the device to communicate with other devices over a network, such as the internet. These components may be implemented in hardware, software, or firmware, or some combination of two or more of these. There are number of additional ways to streamline parallel processing with multiple processors in the apparatus 800. For example, it is possible to "unroll" processing loops, e.g., by replicating code on two or more processor cores and having each processor core implement the code to process a different piece of data. Such an implementation may avoid a latency associated with setting up the loop.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A video encoding method for encoding at least two video input streams, comprising:
    downscaling an input high resolution video stream to generate a first video input stream of the at least two video input streams at a preprocessing module, wherein the first video input stream is compatible with a hardware encoder and is characterized by a lower resolution than the input high resolution video stream, wherein a second video input stream of the at least two video input streams is the input high resolution video stream;
    performing a first portion of a video encoding task on one or more pictures of the first video input stream with the hardware encoder, wherein the hardware encoder encodes the first input video stream to generate a lower resolution encoded video stream;
    delivering compatible motion information of the lower resolution encoded video stream from the hardware encoder to a buffer for use by the software encoder; and
    performing a second portion of the video encoding task for one or more pictures in the second video input stream by executing a software encoder on a programmable processor, wherein the software encoder implements higher resolution video encoding utilizing the lower resolution encoded video stream as a prediction reference, wherein the software encoder obtains motion information from the lower resolution encoded video stream, wherein obtaining the motion information shortens a motion search performed by the software encoder during the higher resolution video encoding.

2. A video encoding method, comprising:
    splitting a video input stream into a first video input stream and a second video input stream;
    downscaling an input high resolution video stream to generate a first video input stream of the at least two video input streams at a preprocessing module, wherein the first video input stream is compatible with a hardware encoder and is characterized by a lower resolution than the input high resolution video stream, wherein a second video input stream of the at least two video input streams is the input high resolution video stream;
    performing a first portion of a video encoding task on one or more pictures of the first video input stream with the hardware encoder, wherein the hardware encoder encodes the first input video stream to generate a lower resolution encoded video stream;
    delivering compatible motion information of the lower resolution encoded video stream from the hardware encoder for use by the software encoder to a buffer; and
    performing a second portion of the video encoding task for one or more pictures of the second video input stream by executing a software encoder on a programmable processor, wherein the software encoder implements higher resolution video encoding utilizing the lower resolution encoded video stream as a prediction reference, wherein the software encoder obtains motion information from the lower resolution encoded video stream, wherein obtaining the motion information shortens a motion search performed by the software encoder during the higher resolution video encoding.

3. The method of claim 2, wherein the software encoder utilizes the encoded I and/or P pictures as references for the B picture encoding.

4. The method of claim 1, wherein the one or more encoding features of the second portion of the video encoding task include utilization of two or more reference frames for the encoding of a frame in a video input stream.

5. The method of claim 1, wherein the software encoder utilizes two or more encoded frames from the first video input stream as a reference frame for encoding each frame in the second video input stream.

6. The method of claim 1, wherein the one or more features of the second portion of the video encoding task include encoding a multi-view profile, wherein the multiview profile is comprised of two or more video input streams.

7. The method of claim 6, wherein the software encoder utilizes the encoded first video input stream as a reference for encoding the second video input stream.

8. The method of claim 6, wherein the first video input stream and the second video input stream produce a three-dimensional image when combined.

9. The method of claim 6, wherein the first video input stream is obtained from a first video camera and the second video input stream is obtained from a second video camera.

10. The method of claim 1, wherein the one or more encoding features of the second portion of the video encoding task include multi-pass encoding.

11. The method of claim 10, wherein an output from the first portion of the video encoding task is used by the software encoder as a prediction reference.

12. The method of claim 11, wherein the second potion of the video encoding task further comprises alpha blending the second video input stream with the first video input stream.

13. The method of claim 12, wherein the second video input stream is a computer generated texture.

14. The method of claim 1, wherein the second portion of the video encoding task includes encoding the high-resolution video input stream by utilizing the information in the encoded lower-resolution video input stream for rate control.

15. The method of claim 1, wherein the high-resolution video input stream is comprised of two or more video input streams.

16. The method of claim 15, wherein each of the two or more video input streams are a view of a separate gamer in a multi-player video game.

17. The method of claim 1, wherein the one or more features of the second portion of the video encoding task include encoding a high frame rate video input stream.

18. The method of claim 17, wherein the first portion of the video encoding task comprises scaling down the high frame rate video input stream into a low frame rate video input stream, and wherein the second portion of a video encoding task comprises encoding the high frame rate video input stream by utilizing the encoded low frame rate video input stream as a prediction reference.

19. The method of claim 18, wherein the low frame rate video input utilizes one frame for every four frames in the high frame rate video input stream.

20. The method of claim 17, wherein the first portion of the video encoding task comprises scaling down the high frame rate video input stream into a low frame rate video input stream, and wherein the second portion of a video encoding task comprises encoding the high frame rate video input stream by utilizing the information in the encoded low frame rate video input stream for rate control.

21. The method of claim 18, wherein the high frame rate video input stream is 120 frames per second.

22. The method of claim 1, wherein the second portion of the video encoding task includes encoding a video input stream that is in a tree structure.

23. The method of claim 22, wherein the first portion of the video encoding task comprises encoding one or more video frames that form a trunk of the tree structure, and wherein the second portion of the video encoding task comprises encoding one or more video frames that form one or more branches of the tree structure.

24. The method of claim 23, wherein the software encoder utilizes the one or more encoded video frames of the trunk of the tree structure as a reference frame for one or more of the video frames of the one or more branches of the tree structure.

25. An video encoding apparatus for encoding at least two video input streams, comprising:
a hardware encoder; and
a processor coupled to the hardware encoder, wherein, the processor is configured to implement a software encoder,
a preprocessing module, wherein the preprocessing module is configured downscale n input high resolution video stream to generate a first video input stream, wherein the first video input stream is compatible with the hardware encoder and is characterized by a lower resolution than the input high resolution video stream, wherein a second video input stream of the at least two video input streams is the input high resolution video stream;
wherein the hardware encoder and software encoder implement a video encoding task for one or more pictures of the first video input stream by performing a first portion of a video encoding task on the one or more pictures with the hardware encoder, wherein the hardware encoder encodes the first input video stream to generate a lower resolution encoded video stream, and performing a second portion of the encoding task on one or more pictures of a second video input stream by executing a software encoder on a programmable processor;
delivering compatible motion information of the lower resolution encoded video stream to a buffer from the hardware encoder for use by the software encoder; and
wherein the software encoder implements higher resolution video encoding utilizing the lower resolution encoded video stream as a prediction reference, wherein the software encoder obtains motion information from the lower resolution encoded video stream, wherein obtaining the motion information shortens a motion search performed by the software encoder during the higher resolution video encoding.

26. A non-transitory computer readable medium having embodied therein computer readable instructions that implement a software encoder, wherein execution of the instructions by one or more programmable processors of a computer system causes the one or more processors to carry out the steps of:
augmenting the implementation of a first portion of a video encoding task on one or more pictures of a first video stream by a hardware encoder by implementing a second portion of the video encoding task on one or more pictures of a second video stream, wherein an input high resolution video stream is downscaled by a preprocessing module to generate the first input video stream, wherein the first video input stream is compatible with the hardware encoder and is characterized by a lower resolution than the input high resolution video stream, wherein a second video input stream of the at least two video input streams is the input high resolution video stream, wherein the hardware encoder encodes the first input video stream to generate a lower resolution encoded video stream, wherein compatible motion information of the lower resolution encoded video stream is delivered to a buffer from the hardware encoder for use by the software encoder, wherein the software encoder implements higher resolution video encoding utilizing the encoded lower resolution video stream as a prediction reference, wherein the software encoder obtains motion information from the encoded lower resolution video stream, wherein obtaining the motion information shortens a motion search performed by the software encoder during the higher resolution video encoding.

* * * * *